United States Patent [19]

Hill

[11] 4,309,084
[45] Jan. 5, 1982

[54] MAGNETO-OPTICAL LIGHT MODULATOR

[75] Inventor: Bernhard Hill, Hamburg, Fed. Rep. of Germany

[73] Assignee: U.S. Philips Corporation, New York, N.Y.

[21] Appl. No.: 31,571

[22] Filed: Apr. 19, 1979

[51] Int. Cl.³ ............................ G02F 1/09; G02F 1/25
[52] U.S. Cl. ...................................... 350/377; 350/403
[58] Field of Search ............................ 350/150–151, 350/157, 158, 377, 403; 250/225; 358/61; 365/122; 346/74.1

[56] References Cited

U.S. PATENT DOCUMENTS

| | | | |
|---|---|---|---|
| 3,141,920 | 7/1964 | Bebb et al. | 350/151 |
| 3,512,864 | 5/1970 | Haertling et al. | 365/122 |
| 3,775,570 | 11/1973 | Lewicki et al. | 350/151 |
| 3,915,553 | 10/1975 | Adams et al. | 350/150 |

FOREIGN PATENT DOCUMENTS 2355852  5/1974  Fed. Rep. of Germany .

*Primary Examiner*—William H. Punter
*Attorney, Agent, or Firm*—Thomas A. Briody; William J. Streeter; Algy Tamoshunas

[57] ABSTRACT

The light source produces two colors and is combined with an optical dispersive element for the wavelength-dependent rotation of the plane of polarization of a light beam transmitted by the dispersive element, the layer having a modulation characteristic to enable each modulation element in combination with the polarizer to transmit or to block one color or the other color of the two colors produced by the light source.

3 Claims, 12 Drawing Figures

$$\frac{I_2}{I_{2,max}} = \sin^2(\beta_0 \pm \varphi)$$

$$\eta_F = \sin^2(\beta_0 + \varphi)$$

$$C = \frac{\sin^2(\beta_0 + \varphi)}{\sin^2(\beta_0 - \varphi)}$$

$\varphi_{ges} = +2\varphi$ $\varphi_{ges} = 0$ $\varphi_{ges} = 0$ $\varphi_{ges} = -2\varphi$

MAGNETO-OPTICAL LIGHT MODULATOR

BACKGROUND OF THE INVENTION

The invention relates to a magneto-optical light modulator, comprising a light source, a polarizer, an analyzer, a substrate, which on a first side supports a Faraday rotation layer. The Faraday rotation layer is positioned between the polarizer and the analyzer, and has having a plurality of modulation elements. Electronic means are provided for switching the magnetization state of selected modulation elements of the Faraday rotation layer, which elements undergo the Faraday effect dependent on their magnetization state, by which effect the polarization plane of a light beam produced by the light source and transmitted through the layer is rotated. The Faraday effect is defined as the phenomenon in which the plane of polarization of linearly polarized light is rotated into the direction of magnetization when it passes through a magnetic substance.

The theoretical background of magneto-optical light modulators or light switches, is described in Applied Optics, 7, 1968, pp 2432-2433, while a more detailed description of light modulators of the present type can be found in German patent application Publication No. 26 06 596. The present invention provides switchable thin-layer elements which are supported on a substrate whose magnetization state can be selectively switched electronically by a thermomagnetic switching method.

The magnetization state can be made visible as a bright-dark distribution via the Faraday effect, so that the present light modulator may be used for the optical display of data as an electronically switchable transparency. Once a given magnetization state has been produced, it remains stored for an indefinite period of time (bistable switching method) but it can also be switched as often as may be desired.

It is the object of the present invention to use the magneto-optical components for the spatial light modulation of dichroic light for a coloured display of data by a suitable use of the spectral properties of the modulation elements, in which the colour selection and the colour modulation can be carried out with each individual modulation element simultaneously for both colours.

SUMMARY OF THE INVENTION

The present invention provides a light modulator having a light source which produces two colours that are combined with an optical dispersive element for the wavelength-dependent rotation of the plane of polarization of the light source for transmission by the dispersive element. The light modulator also comprises a Faraday rotation layer having a modulation characteristic to enable each modulation element of the Faraday rotation layer in combination with polarizer to transmit or to block one colour or the other colour of the two colours produced by the light source.

Advantageously, each modulation element has two magnetization states and the operating points on the modulation characteristic are chosen so that for one magnetization state substantially only one light colour is transmitted and for the other magnetization state substantially only the other light colour is transmitted.

It is particularly advantageous when the substrate supports on a second side opposite to the first side, a second Faraday rotation layer of the same geometry and position as the layer on the first side, so that the plane of polarization of each light beam passing through a modulation element on the first side can be switched on the second side by a second modulation element independently of the first element and that the operating points on the modulation characteristic are arranged so that for a first switching position of the two modulation elements substantially only light of one colour is transmitted and for a second position substantially only light of the second colour is transmitted and for a third switching position of the two modulation elements both light colours are substantially switched-off.

The essential advantage of the invention consists in that a polychromatic display is made possible by means of magneto-optical modulation components without this increasing the number of the modulation elements or restricting the definition of a light distribution to be displayed.

BRIEF DESCRIPTION OF THE DRAWINGS

The invention will now be described in greater detail, by way of example, with reference to the accompanying drawing, wherein.

DESCRIPTION OF THE EMBODIMENTS

Figures 1A, 1B:
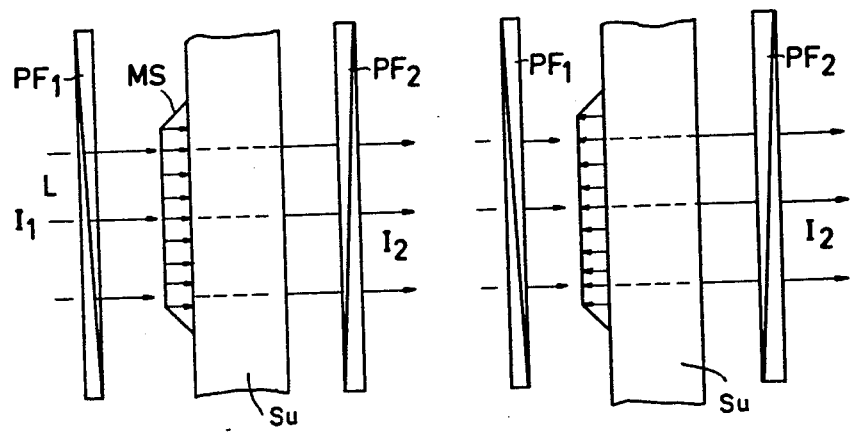
FIGS. 1a and b are diagrammatic sectional views of a magneto-optical modulation element.

FIGS. 1a and b are diagrammatic sectional views through a single magneto-optical modulation element in a polarization optics consisting of two polarization sheets $PF_1$ and $PF_2$. The magneto-optical modulation element MS, which may be constructed, for example, of an iron garnet layer with special doping, consists substantially of a thin magneto-optical layer (for example from 3 to 8 micrometers thick) covering an area of, for example, $10 \times 10$ $\mu m^2$ or larger on a substrate $S_u$.

The magneto-optical layer is covered with a thin transparent electrode via which a current pulse is conducted for switching. The pulse heats the magnetic layer for a few microseconds so that, by a thermo-magnetic effect, the internal magnetization of the layer can be oriented in the direction of an externally applied magnetic field. Two mutually opposite orientations of the magnetization are possible perpendicular to the surface of the layer. These orientations are stored for an indefinite period of time until switched by of a new current pulse in a magnetic field.

In accordance with the mutually opposite orientations of the magnetization, the plane of polarization is rotated through an angle $\pm \phi$ to the right or to the left in the direction of propagation of the passing light which is polarized, for example, by polarization sheet $PF_1$. In order to modulate the light intensity, a further polarization sheet $PF_2$ is arranged at the output the transmissive direction of which encloses a certain angle $\beta_o$ to the normal to the plane of polarization of the incident light. When the polarization sheet is adjusted so that its transmissive direction is perpendicular to the plane of polarization of the light emerging from the modulation elements MS, no light is transmitted. However, for the switched magnetization, light may emerge. When the direction of transmission corresponds to the plane of polarization of the light, a maximum light intensity $I_{2,max}$ is obtained at the output. Generally, dependent on the angle $\beta_o$ the light intensity at the output is related to the maximum intensity:

$$I_2/I_{2,max} = \sin^2\{\beta_o \pm \phi\}.$$

Figure 2:
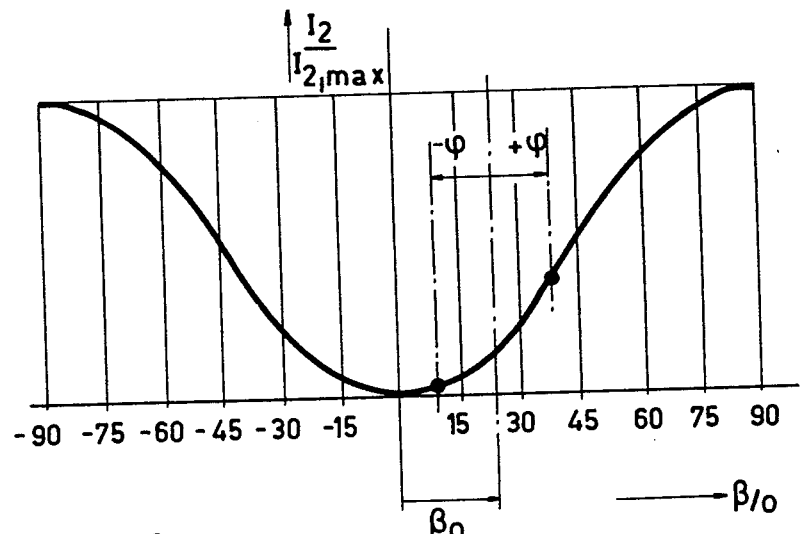
FIG. 2 shows an efficiency curve.

This function describes the modulation characteristic of the device (FIG. 2). The quantity
$$\eta_F = \sin^2\{|\beta_0| \pm |\phi|\}$$
is denoted as an optical efficiency of the modulation element by the Faraday effect (neglecting absorption or reflection).

The ratio of larger to smaller intensity for a selected operating point $\beta_o$ on the characteristic is termed switch contrast C $$C = \frac{\sin^2\{|\beta_o| + |\phi|\}}{\sin^2\{|\beta_o| - |\phi|\}}$$

By the choice of the operating point, the switching contrast can theoretically be adjusted between the values 0 and ∞. In practice, however, it is restricted by stress birefringence occurring in the substrate in addition to the Faraday effect and by the finite extinction ratio of the polarization foils.

The Faraday effect of such a light modulation element depends considerably on the wavelength. Differences up to 1:3 occur in the transition from short light-wavelength to long light-wavelength in the visible range. For a fixedly adjusted operating point of the polarization sheets ($\beta_o$) switching contrast and efficiency also vary in dependence on the wavelength. A purposeful adjustment of the values of contrast and efficiency simultaneously for, for example, two different wavelengths thus requires a dispersive component which permits of adjusting the plane of polarization dependent on the wavelength.

Such a component can be realized, for example, while using the rotation of the plane of polarization of polarized light in certain solids, such as quartz, cinnabar, and so on, or liquids (cane sugar, sodium phosphate and so on). The Faraday rotation in magnetized materials could also be taken into account.

Figure 3:
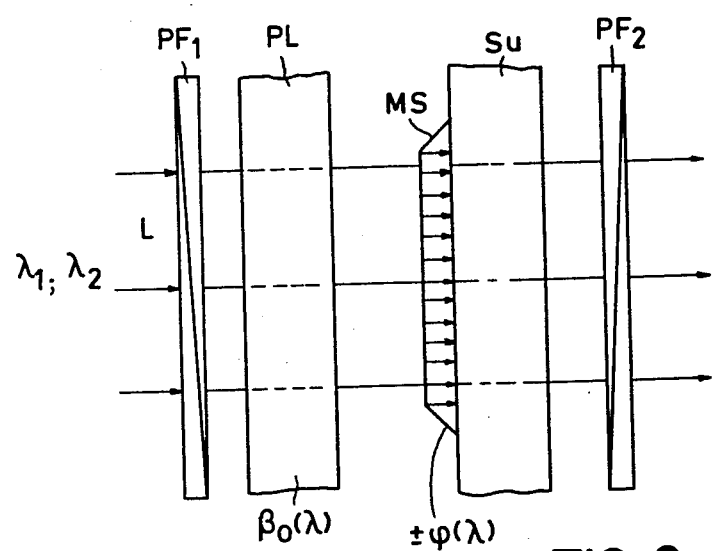
FIG. 3 is a diagrammatic sectional view of an embodiment of the invention.
Figure 4:
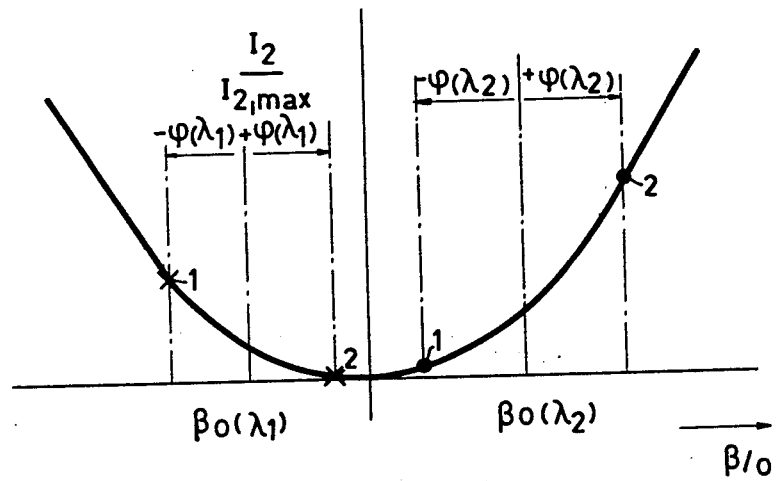
FIG. 4 shows the efficiency curve.
Figure 5A:
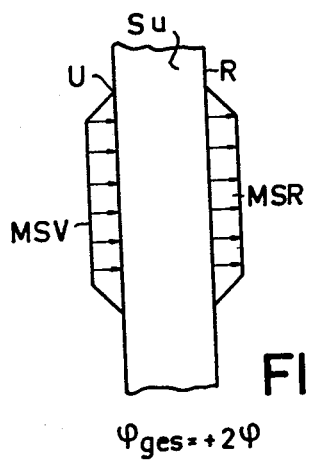
FIGS. 5a to d are diagrammatic sectional views of a double light modulation element.
Figure 5B:
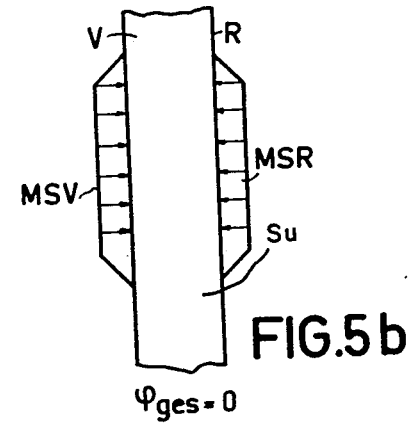
Figure 5C:
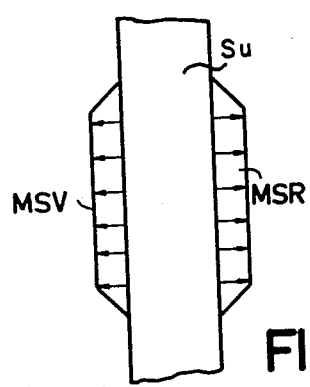
Figure 5D:
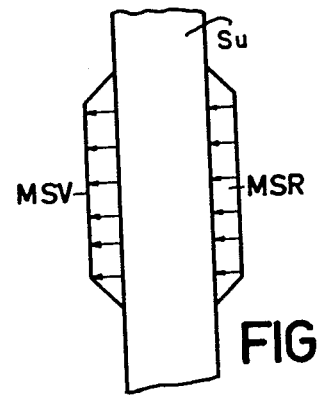

A quartz plate in a certain sectional plane is used, for example, so that the plane of polarization of an incident light beam upon traversing the plate of a certain thickness is rotated by a given fixed amount. For another wavelength, another rotation is obtained. According to the invention, the rotation for two different light-wavelengths is adjusted so that for the same direction of polarization before the plate, an angle occurs behind the plate of $|\beta_o(\lambda_1)| + |\beta_o(\lambda_2)|$ between the plane of polarization of the light of the two wavelengths. The plate PL is then accommodated between the two polarization sheets $PF_1$, $PF_2$ and the light modulation device (MS, SU) as shown in FIG. 3. On the modulation characteristic, with the mutual positions of the polarization sheets in accordance with FIG. 4, the operating points $\beta_o(\lambda_1)$ and $\beta_o(\lambda_2)$ are adjusted so that for light of one wavelength for the switching position 1 of the modulation element MS the light is switched off and for light of the other wavelength the light is switched on, and conversely. By switching the element, alternately one or the other light colour appears at the output.

For example, if an iron garnet layer is chosen of a thickness of 6 μm with a high bismuth content, the following Faraday rotations are obtained for the two light wavelengths $\eta_1 = 620$ nm and $\eta_2 = 540$ nm (red and green) chosen by way of example with the present state of the art of the materials:

$$\lambda_1 (620 \text{ nm}) = 12°, \lambda_2 (540 \text{ nm}) = 30°.$$

With $\beta_o (620 \text{ nm}) = -12°$ and $\beta_o (540 \text{ nm}) = 30°$ an optimum extinction ratio for both columns is obtained. For example, when polaroid sheets are used as polarizors, a switching contrast of approximately 100 can substantially be achieved.

The required dispersion of the planes of oscillation can be adjusted, for example, by means of a quartz plate which is cut perpendicularly to the axis and has a thickness of 6.3 mm. An angle of 32° between the planes of oscillation of the two light colours is adjusted.

The Faraday efficiency $\eta_F$ for the two light positions becomes:

$$\eta_F(620 \text{ nm}) = 17\%$$

$$\eta_F(540 \text{ nm}) = 75\%$$

When in addition the light absorption present in the iron garnet layer is taken into account, which absorption is also strongly dependent on the wavelength, it appears that, for the example chosen, for both light colours in the light position totally approximately 10% of the incident light power is passed by the light switching arrangement:

$$\eta_{overall}(620 \text{ nm}) = 10\%$$

$$\eta_{overall}(540 \text{ nm}) = 10\%$$

The operating points may also be adjusted so that each light colour is not switched off entirely but only with a given switching contrast $C(\lambda)$. Certain mixed colours then appear for the two switching positions.

If for the iron garnet layer mentioned above by way of example, the operating points $$\beta_o (620 \text{ nm}) = 22° \text{ and}$$

$$\beta_o (540 \text{ nm}) = 50°$$

are chosen, then a switching contrast of approximately 10 is obtained for both light colours. The Faraday efficiencies occur at:

$$\eta_F(620 \text{ nm}) = 32\% \text{ and}$$

$$\eta_F(540 \text{ nm}) = 97\%$$

The corresponding overall efficiencies including the light absorption then are:

$$\eta_{overall}(620 \text{ nm}) = 19\% \text{ and}$$

$$\eta_{overall}(540 \text{ nm}) = 13\%$$

For one switching position, 13% of the green light (related to the incident light power) is mixed with 1.9% of the red light at the output of the device, and for the other switching position 19% of the red light is mixed with 1.3% of the green light. The quartz plate as a dispersive element should have a thickness of 10.8 mm so as to produce the difference of the planes in oscillation of $22° + 50° = \eta°$.

Of course, instead of one light source having a dispersive element, two light sources for one and for the other colour may also be used and be formed by two separate polaroid polarization sheets whose angular position of the planes of oscillation have already been rotated correspondingly. The light of these two light sources may then be supplied to the iron garnet layer in a superimposed manner via colour-selective reflection devices as used in colour television cameras.

By very rapidly switching from one colour to the other, the invention also permits a temporarily variable mixed colour adjustment when the duty cycle for switching from one colour to the other and conversely is varied and switching is carried out so rapidly that an observer sees only the integral mean value of the switching states. A continuous transition from one light colour alone via all possible mixed colours to the other light colour may be adjusted.

Another embodiment of the invention permits not only the switching between two colours but also the on and off switching of the two colours. For this purpose, a line-shaped or matrix-shaped modulation structure is provided on the substrate Su not only on the front side but also on the rear side, which structure has the same geometry and position as the structure on the front side (FIGS. 5a-d). In the case of iron garnet layers which are made epitaxially, this is possible in a particularly simple way since the substrate Su already has an iron garnet layer on the front side and the rear side as a result of the dipping process during the manufacture. For "normal" applications the layer on the rear side is removed.

Figure 6:
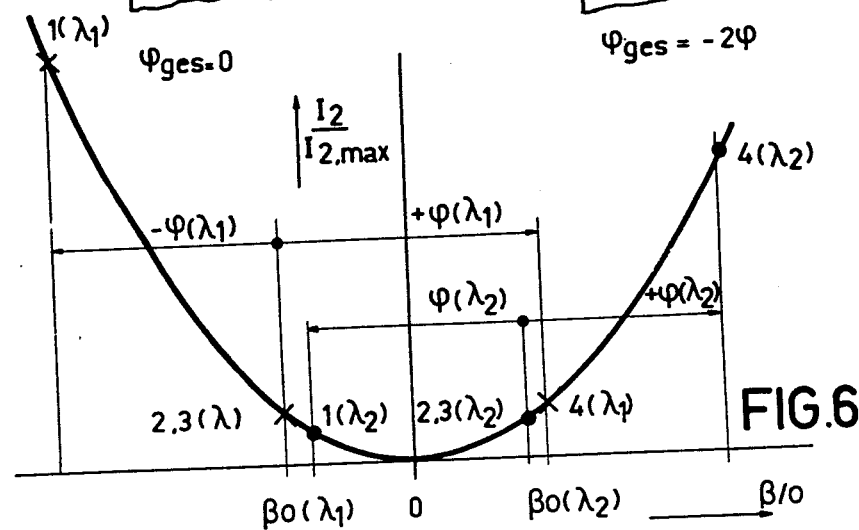
FIG. 6 shows the associated efficiency curve.

This structure on the front side V and rear side R of the substrate Su results in the possibility of switching each individual light beam by a modulation element MSV, MSR with two mutually independent parameters. In accordance with the adjustable magnetizations in FIGS. 5a-d three different values of the total Faraday rotation are obtained from four possible switching positions with the same layer thickness of the modulation elements on the front and rear sides. On the modulation characteristic, the operating points for two light-wavelengths can now be adjusted in accordance with FIG. 6 so that for each two switching positions both colours are substantially switched off and for the switching positions 1 and 4 either one or the other colour is switched on.

By another choice of the operating points, switchable mixed colours can also be produced. By rapidly switching between various switching positions in this embodiment the polychromatic display with brightness modulation is also possible for the human eye or when integrating recording material is used; dichroic display with brightness variation, for example, in that in a rapid time sequence with variable duty cycle once one colour and then the other colour is switched on or off.

Figure 8:
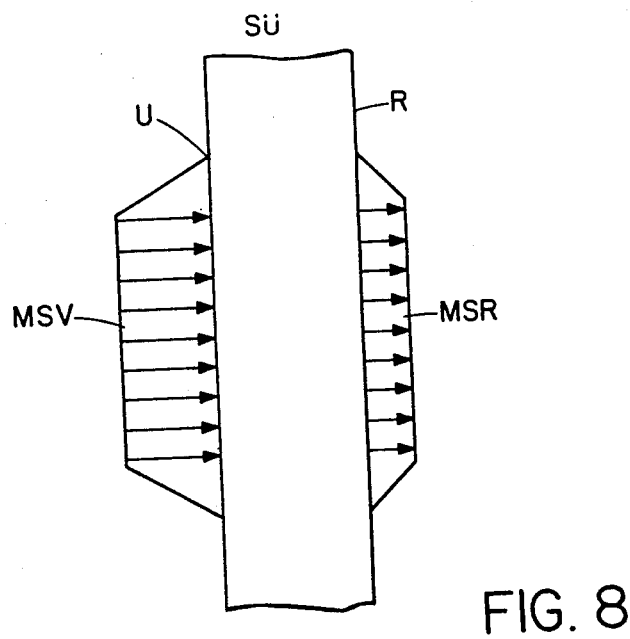
FIG. 8 shows a diagrammatic sectional view of another embodiment of a modulating element of the invention.

Different layer thicknesses on the front and rear sides of the modulation structure can also be made by etching a layer. FIG. 8 shows such an arrangement which the layer thickness on the front side is twice as large as that on the rear side. When the Faraday rotation of the front side is described as $\pm\phi$, the overall rotations ($-3/2\phi$; $-\frac{1}{2}\phi$; $+\frac{1}{2}\phi$; $+3/2\phi$) can be adjusted for the four possible switching positions. In a corresponding arrangement of the modulation characteristic, four different mixed combinations can thus be realized for the colour modulation by switching light of both colors in common.

Figure 7:
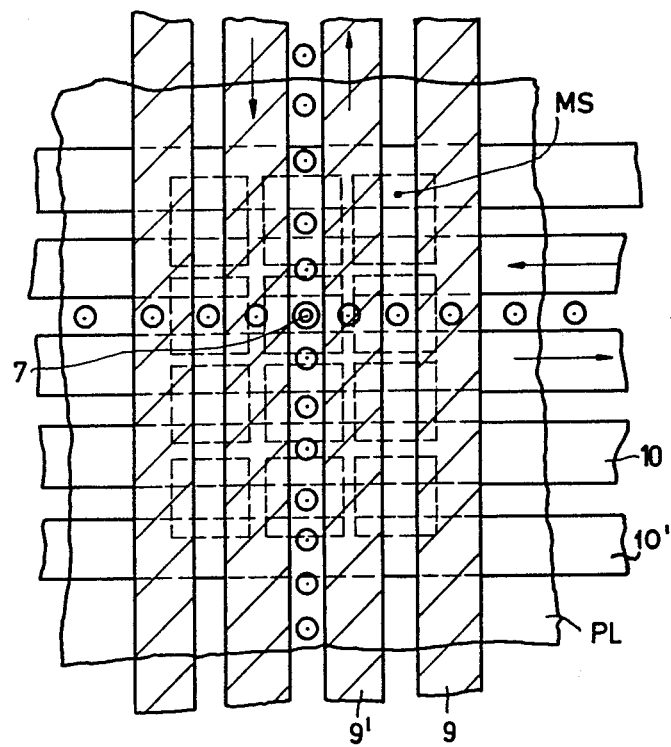
FIG. 7 shows an embodiment of a switching matrix.

FIG. 7 shows an embodiment of a switching matrix having an overlying plate PL of a dispersive medium (for example a quartz plate). The individual modulation elements MS are operated outside the compensation point and are switched only by an applied magnetic field. The magnetic field is produced by conductor elements 9, 9' and 10, 10' which are vapour-deposited on the modulation elements MS. The conductor elements extend pairwise horizontally and vertically, respectively, parallel to the sides of the modulation elements MS, the outer areas of which may be partly covered by the conductor elements. With opposite flow of current in conductor elements associated with one pair, maximum magnetic fields are produced between the parallel conductor elements 9, 9' and 10, 10' which fields add in the center Z of the modulation elements. A magnetic field which has approximately double the strength as in the other areas of the modulation element is formed there, which may be used for selection. The polarizer and the analyzer are not shown in FIG. 7 for reasons of clarity.

What is claimed is:

1. A magneto-optical light modulator comprising: a light source for producing a light beam of two colors, a polarizer, an analyzer, a substrate, said substrate supporting on a first side thereof a first Faraday rotation layer, said first Faraday rotation layer being positioned between said polarizer and said analyzer and having a first plurality of modulation elements, electronic means for switching the magnetization state of selected modulation elements of said first plurality, which modulation elements undergo a Faraday effect dependent on their magnetization state, by which effect the polarization plane of said light beam produced by said light source and transmitted through said Faraday rotation layer is rotated, an optical dispersive element for rotating the plane of polarization of said light from said polarizer depending upon the wavelength of said two colours, said first Faraday rotation layer having a modulation characteristic so as to enable each modulation element in combination with the polarizer and analyzer to transmit or to block either of the two colours produced by said light source, and a second Faraday rotation layer having a second plurality of modulation elements supported on a side of said substrate opposite said first side, said second Faraday layer having a geometry and being position so that the plane of polarization of said light beam passing through a modulation element of said first plurality can be rotated independently by a modulation element of said second plurality and wherein the operating points of the modulation characteristic are arranged so that for a first switching position of the modulation elements of said first and second plurality substantially only light of one colour is transmitted and for a second switching position substantially only light of the second colour is transmitted and for a third switching position both light colours are substantially switched-off.

2. A magneto-optical light modulator as claimed in claim 1, wherein each modulation element of said first Faraday rotation layer has two magnetization states and the operating points of the modulation characteristic are chosen so that for one magnetization state substantially only one light colour is transmitted.

3. A magneto-optical light modulator as claimed in claim 1, wherein the layer thicknesses of said Faraday rotation layers on the first and second sides of said substrate are different so that by corresponding selection of operating points in the modulation characteristic, in addition to the switching positions for light of only one of the two light colours, light of both colours can be switched in common.

* * * * *